US011450850B2

(12) United States Patent
Browne et al.

(10) Patent No.: US 11,450,850 B2
(45) Date of Patent: Sep. 20, 2022

(54) CONFIGURING ANISOTROPIC EXPANSION OF SILICON-DOMINANT ANODES USING PARTICLE SIZE

(71) Applicant: Enevate Corporation, Irvine, CA (US)

(72) Inventors: Ian Browne, Orange, CA (US); Benjamin Park, Mission Viejo, CA (US); Jill Renee Pestana, Long Beach, CA (US); Fred Bonhomme, Lake Forest, CA (US); Monika Chhorng, Irvine, CA (US); David J. Lee, Irvine, CA (US); Heidi Anderson, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 16/681,788

(22) Filed: Nov. 12, 2019

(65) Prior Publication Data
US 2021/0143432 A1 May 13, 2021

(51) Int. Cl.
H01M 4/38 (2006.01)
H01M 4/66 (2006.01)
(Continued)

(52) U.S. Cl.
CPC ......... *H01M 4/386* (2013.01); *H01M 4/0435* (2013.01); *H01M 4/661* (2013.01); *H01M 2004/021* (2013.01)

(58) Field of Classification Search
None
See application file for complete search history.

(56) References Cited

U.S. PATENT DOCUMENTS

2009/0239151 A1* 9/2009 Nakanishi ........... H01M 4/0428
429/231.95
2010/0266902 A1* 10/2010 Takano ................. H01M 4/622
429/231.95
(Continued)

OTHER PUBLICATIONS

Notification of Transmittal of The International Search Report and The Written Opinion of the International Searching Authority, or t,he Declaration for International Application No. PCT/US2020/058159, International Filing Date Oct. 30, 2020; dated Dec. 22, 2020.

*Primary Examiner* — Ula C Ruddock
*Assistant Examiner* — Tony S Chuo
(74) *Attorney, Agent, or Firm* — McAndrews, Held & Malloy, Ltd.

(57) ABSTRACT

Systems and methods for configuring anisotropic expansion of silicon-dominant anodes using particle size may include a cathode, an electrolyte, and an anode, where the anode may include a current collector and an active material on the current collector. An expansion of the anode during operation may be configured by utilizing a predetermined particle size distribution of silicon particles in the active material. The expansion of the anode may be greater for smaller particle size distributions, which may range from 1 to 10 μm. The expansion of the anode may be smaller for a rougher surface active material, which may be configured by utilizing larger particle size distributions that may range from 5 to 25 μm. The expansion may be configured to be more anisotropic using more rigid materials for the current collector, where a more rigid current collector may comprise nickel and a less rigid current collector may comprise copper.

8 Claims, 9 Drawing Sheets

(51) Int. Cl.
*H01M 4/04* (2006.01)
*H01M 4/02* (2006.01)

(56) References Cited

U.S. PATENT DOCUMENTS

| | | | |
|---|---|---|---|
| 2014/0106230 A1* | 4/2014 | Kim | H01M 4/583 |
| | | | 429/231.8 |
| 2014/0166939 A1* | 6/2014 | Park | H01M 4/366 |
| | | | 252/502 |
| 2017/0012282 A1* | 1/2017 | Kondo | H01M 4/663 |

* cited by examiner

CONFIGURING ANISOTROPIC EXPANSION OF SILICON-DOMINANT ANODES USING PARTICLE SIZE

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for configuring anisotropic expansion of silicon-dominant anodes using particle size.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for anisotropic expansion of silicon-dominant anodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
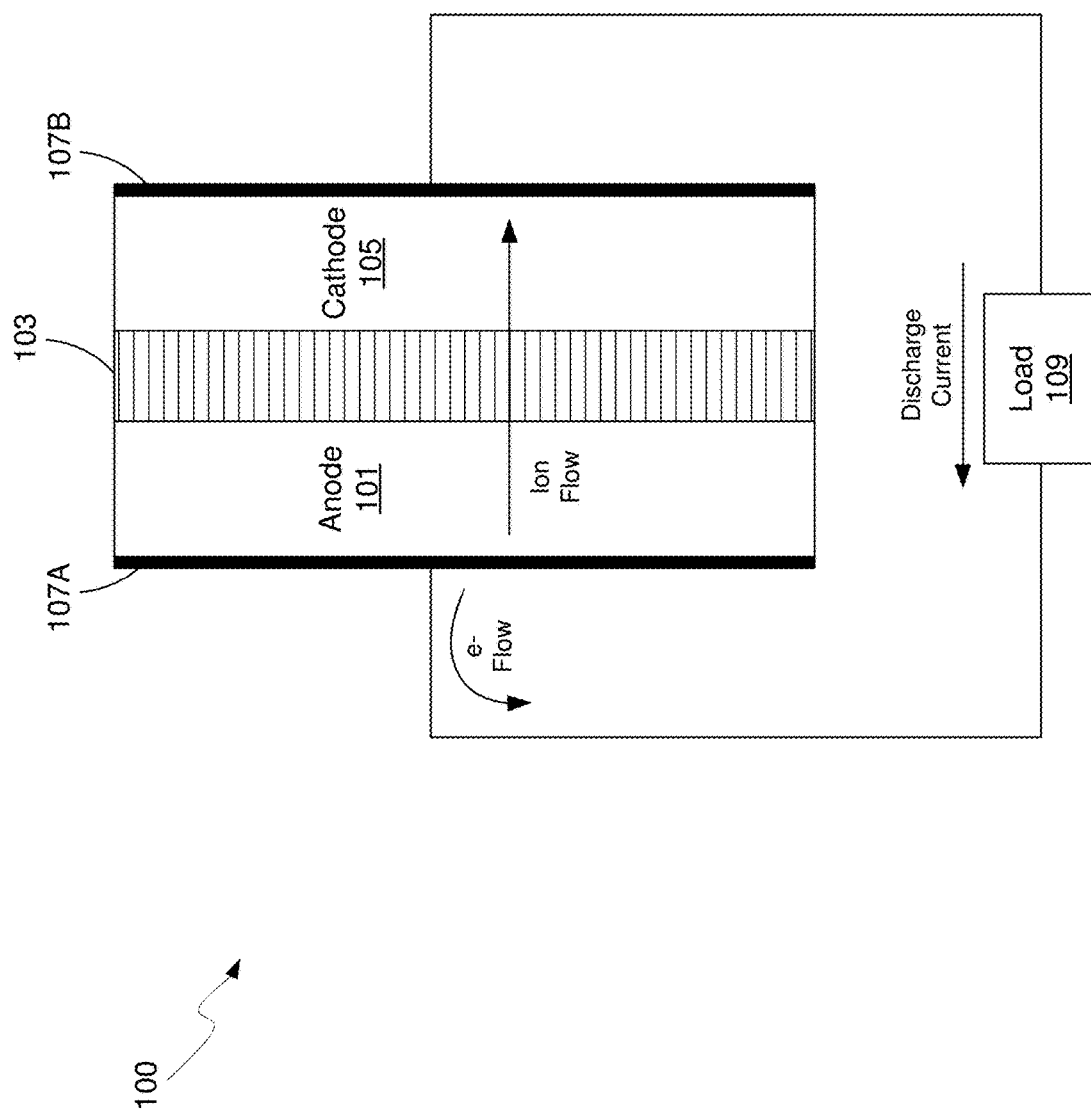
FIG. 1 is a diagram of a battery with anode expansion configured via silicon particle size, in accordance with an example embodiment of the disclosure.

FIG. 1 is a diagram of a battery with anode expansion configured via silicon particle size, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

A solution to the expansion of anodes is to configure the expansion that occurs with lithiation by configuring the size of the silicon particles in the anode active material. Silicon particles with a particle size distribution in a certain range (e.g. 5 μm to 25 μm) form films exhibiting less expansion than films made from silicon particles in a different range (e.g. 1 μm to 10 μm). Anodes with less dense, or more porous, active materials show reduced expansion, and lower density and more porosity may result when using larger silicon particles. Furthermore, electrodes with rough surfaces have reduced expansion as compared to electrodes with smooth surfaces, and use of larger silicon particles may result in a rougher surface. The size of the particles may be configured by the source material and/or the mixing process when preparing the slurry for anode formation.

Figure 2:
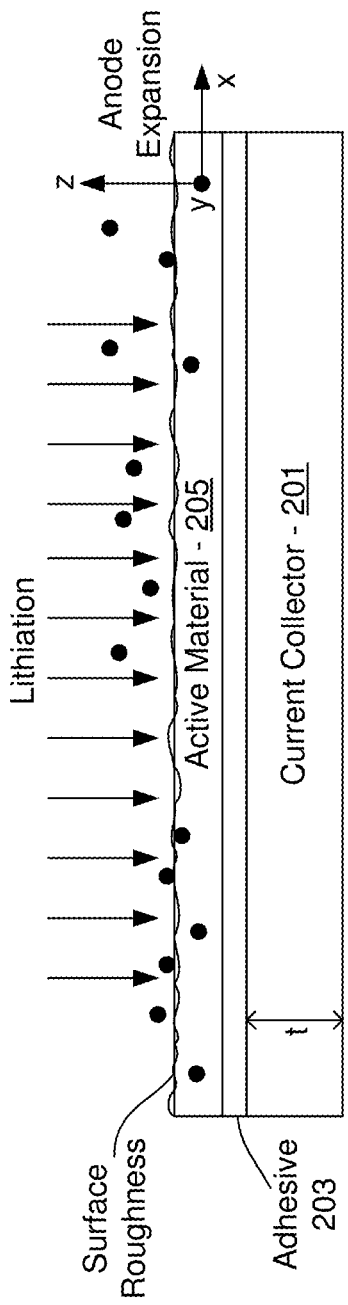
FIG. 2 illustrates anode expansion during lithiation, in accordance with an example embodiment of the disclosure.

FIG. 2 illustrates anode expansion during lithiation, in accordance with an example embodiment of the disclosure. Referring to FIG. 2, there is shown a current collector 201, adhesive 203, and an active material 205. It should be noted that the adhesive 203 may or may not be present depending on the type of anode fabrication process utilized, as the adhesive is not necessarily present in a direct coating process. Furthermore, while FIG. 2 illustrates a single-sided anode for simplicity, the active material 205 may be present on both sides of the current collector 201. In an example scenario, the active materials comprises silicon particles in a binder material and a solvent, the active material being pyrolyzed to turn the binder into a glassy carbon that provides a structural framework around the silicon particles and also provides electrical conductivity. The active material may be coupled to the current collector 201 using the adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 10 μm thick, such as 20 μm for copper, for example, while thinner foils may be less than 10 μm, such as 5-6 μm thick or less for copper.

In another example scenario, when the current collector 201 is thinner, on the order of 5-6 μm or less for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 μm nickel foil current collectors, very low expansion and no cracking results. Furthermore, different alloys of metals may be utilized to obtain desired thermal conductivity, electrical conductivity, and tensile strength, for example.

In an example scenario, in instances where adhesive is utilized, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired chemistry, as long as they do not degrade, react, or dissolve in the electrolyte used. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

As stated above, particle size is a variable that affects expansion, where the particle size can influence the density of the material and/or surface roughness. Use of larger particles results in more roughness in the anodes, which leads to less expansion in lateral directions, and also results in less dense layers, which also expand less.

Figure 3:
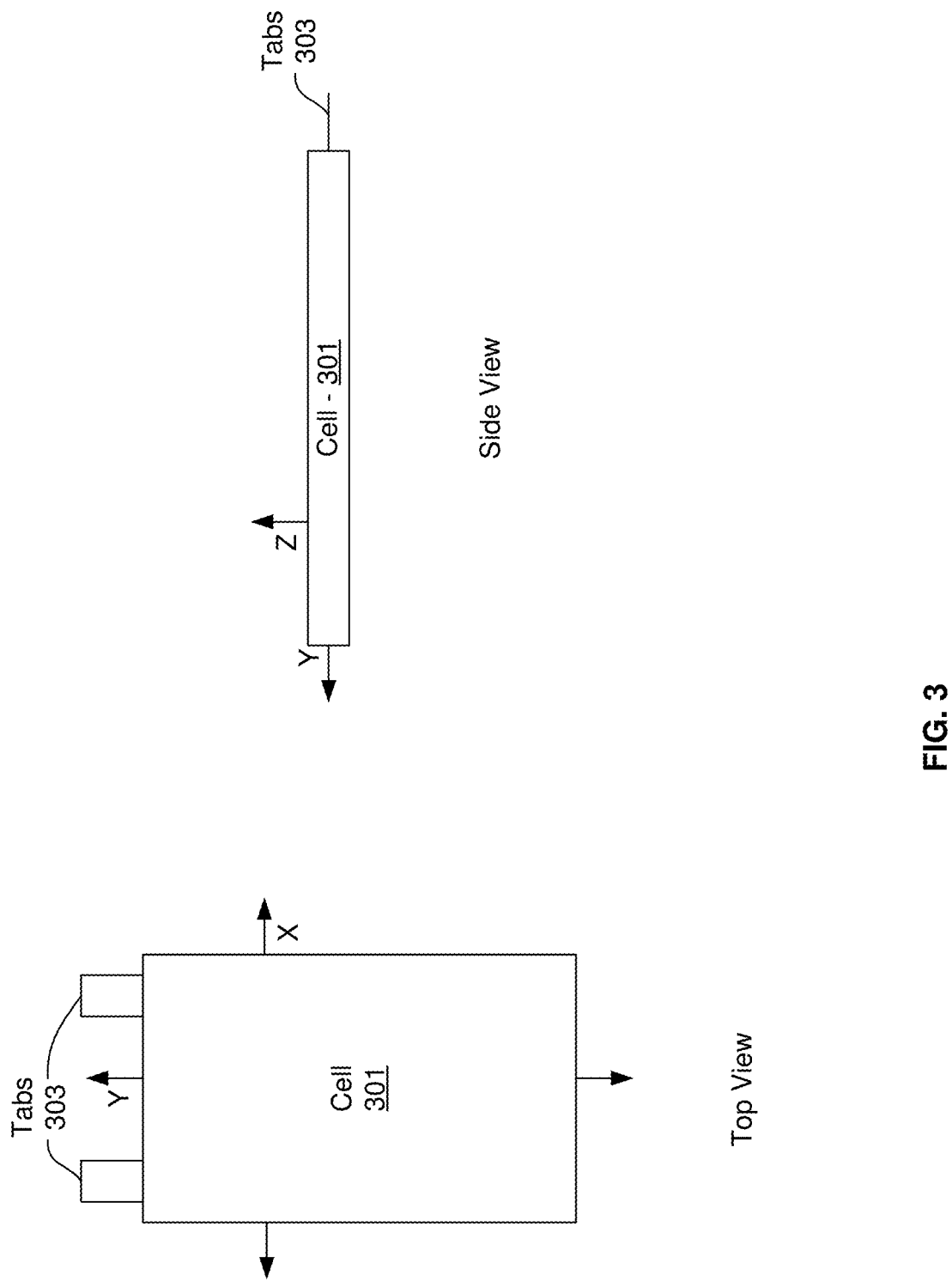
FIG. 3 shows top and side views of a pouch cell, in accordance with an example embodiment of the disclosure.

FIG. 3 shows top and side views of a pouch cell, in accordance with an example embodiment of the disclosure. Referring to FIG. 3, there is shown pouch cell 301 with foil tabs 303 for providing contact to the anode and cathode within the cell 301. Rather than using a metallic cylinder and glass-to-metal electrical feed-through for insulation, conductive foil tabs welded to the electrodes and sealed to the pouch carry the positive and negative terminals to the outside. The pouch cell offers a simple, flexible and lightweight solution to battery design, and allows some expansion in the z-direction due to the ability to expand slightly, but is less forgiving with x-y expansion. For at least this reason, it is desirable to limit expansion overall, but for any expansion that does occur, it is desirable to configure expansion in the z-direction primarily and restrict it in the x-y directions.

Figure 4:
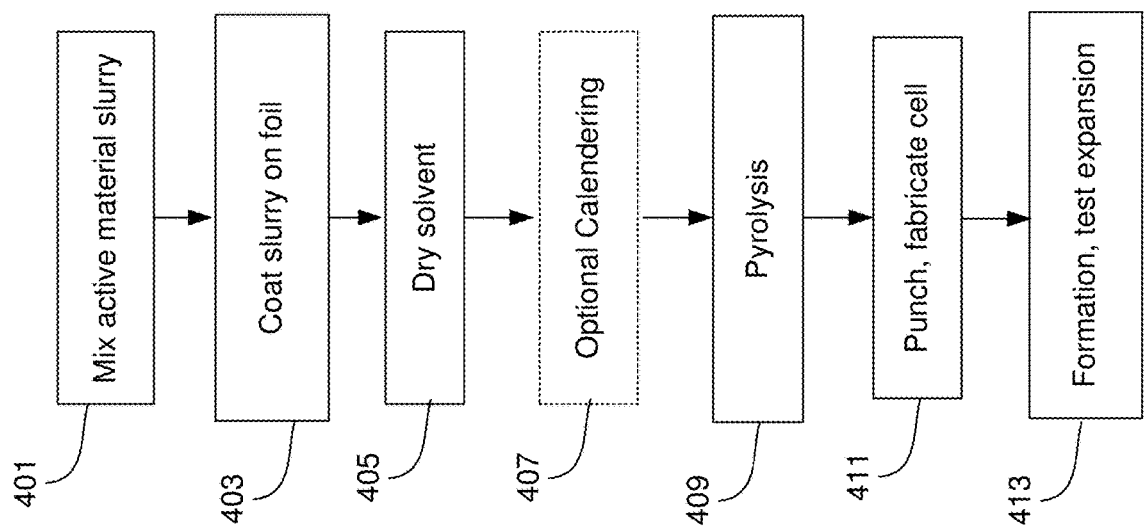
FIG. 4 is a flow diagram of a process for reduced expansion in a silicon anode, in accordance with an example embodiment of the disclosure.

FIG. 4 is a flow diagram of a process for reduced expansion in a silicon anode, in accordance with an example embodiment of the disclosure. While one process to fabricate composite electrodes comprises a high-temperature pyrolysis of an active material on a substrate coupled with a lamination process, this process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PI and mixtures and combinations thereof. The process described here is for reduced anode expansion overall, but expansion primarily in the z-direction while x-y expansion is decreased.

In step 401, the raw electrode active material may be mixed using a binder/resin (such as PI, PAI), solvent, and conductive carbon. For example, graphene/VGCF (1:1 by weight) may be dispersed in NMP under sonication for, e.g., 1 hour followed by the addition of Super P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 900-1100 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30% to 60%. The solids content of the anode slurry is largely dependent on particle size of active material and binder/resin molecular weight and viscosity. The particle size and mixing times may be varied to configure the active material density and/or roughness. For example, larger particle sizes, with a particle size distribution range from 5 μm to 25 μm, as compared to a silicon particle size distribution in a 1 μm to 10 μm range, result in less dense and rough active layers. Silicon with higher particle size produces thicker coatings with lower density, which reduces expansion in all directions. Similarly, longer mixing times in a ball miller result in smaller particles sizes, and thus smoother, more dense active layers, but increased expansion.

In step 403, the slurry may be coated on the foil at a loading of, e.g., 3-4 mg/cm$^2$, which may undergo drying in step 405 resulting in less than 15% residual solvent content. In step 407, an optional calendering process may be utilized where a series of hard pressure rollers may be used to finish the film/substrate into a smoother and denser sheet of material. Calendering may cause increased z-direction expansion, while x-y expansion is not affected, but even by incorporating a calendaring process, the expansion is generally not more than would be if there had been no calendering.

In step 409, the active material may be pyrolyzed by heating to 500-800° C. such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis may be done either in roll form or after punching in step 411. If done in roll form, the punching is done after the pyrolysis process. The punched electrode may then be sandwiched with a separator and cathode with electrolyte to form a cell. In step 413, the cell may be subjected to a formation process, comprising initial charge and discharge steps to lithiate the anode, with some residual lithium remaining. The expansion of the anode may be measured to confirm the reduced and anisotropic expansion, i.e., little x-y expansion and primarily z-direction expansion.

Figure 5:
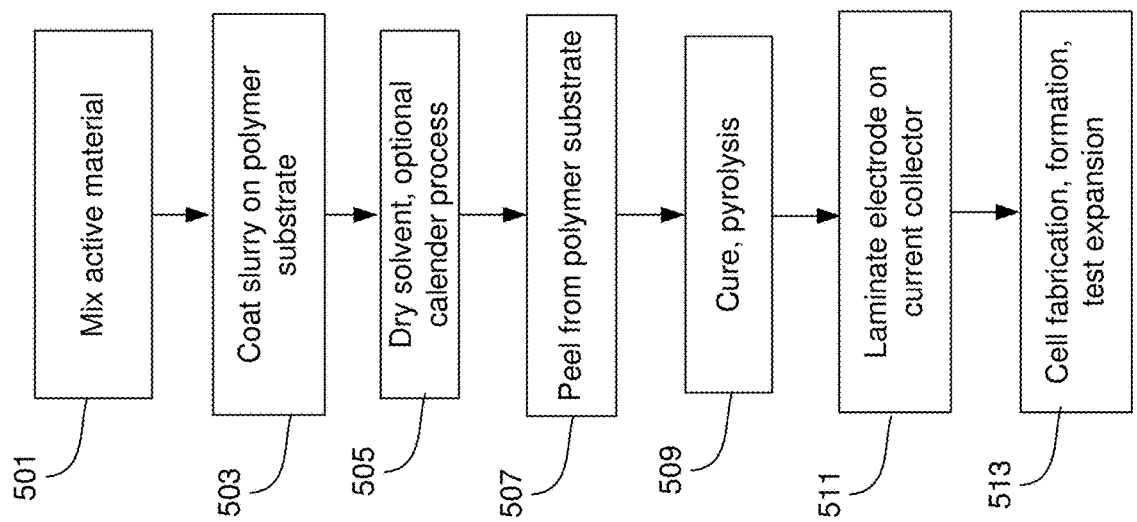
FIG. 5 is a flow diagram of an alternative process for reduced expansion in a silicon anode, in accordance with an example embodiment of the disclosure.

FIG. 5 is a flow diagram of an alternative process for reduced expansion in a silicon anode, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 5, starting with step 501 where the active material may be mixed with a binder/resin such as polyimide (PI) or polyamide-imide (PAI), solvent, a silane/silosilazane additive, and optionally a conductive carbon. As with the process described in FIG. 4, graphene/VGCF (1:1 by weight) may be dispersed in NMP under sonication for, e.g., 1 hour followed by the addition of Super P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30% to 60%. The particle size and mixing times may be varied to configure the active material density and/or roughness. For example, larger particle sizes, with a particle size distribution range from 5 μm to 25 μm, as compared to a silicon particle size distribution in a 1 μm to 10 μm range, result in less dense and rough active layers. Silicon with larger particle size distributions produces thicker coatings with lower density, which reduces expansion in all directions. Similarly, longer mixing times in a ball miller result in smaller particles sizes, and thus smoother, more dense active layers, and increased expansion.

In step 503, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 13-20% solvent content), and then dried to remove a portion of the solvent in step 505. An optional calendering process may be utilized where a series of hard pressure rollers may be used to finish the film/substrate into a smoothed and denser sheet of material. Calendering may cause increased z-direction expansion, while not affecting the degree of x-y expansion, but even by incorporating a calendaring process, the total thickness is not more than would be if there had been no calendering.

In step 507, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 509 where the film may be cut into sheets, and vacuum dried using a two-stage process (100-140° C. for 15 h, 200-240° C. for 5 h). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 511, the pyrolyzed material may be flat press or roll press laminated on the current collector, where a copper foil may be coated with polyamide-imide with a nominal loading of 0.3-0.7 mg/cm$^2$ (applied as a 6 wt % varnish in NMP, dried 10-30 hours at 100-120° C. under vacuum). The silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 513, the electrode may then be sandwiched with a separator and cathode with electrolyte to form a cell. The cell may be subjected to a formation process, comprising initial charge and discharge steps to lithiate the anode, with some residual lithium remaining. The expansion of the anode may be measured to confirm reduced expansion and anisotropic nature of the expansion. The larger silicon particle size results in a rougher surface, higher porosity and less dense material, which reduces the expansion of the active material during lithiation.

Figure 6:
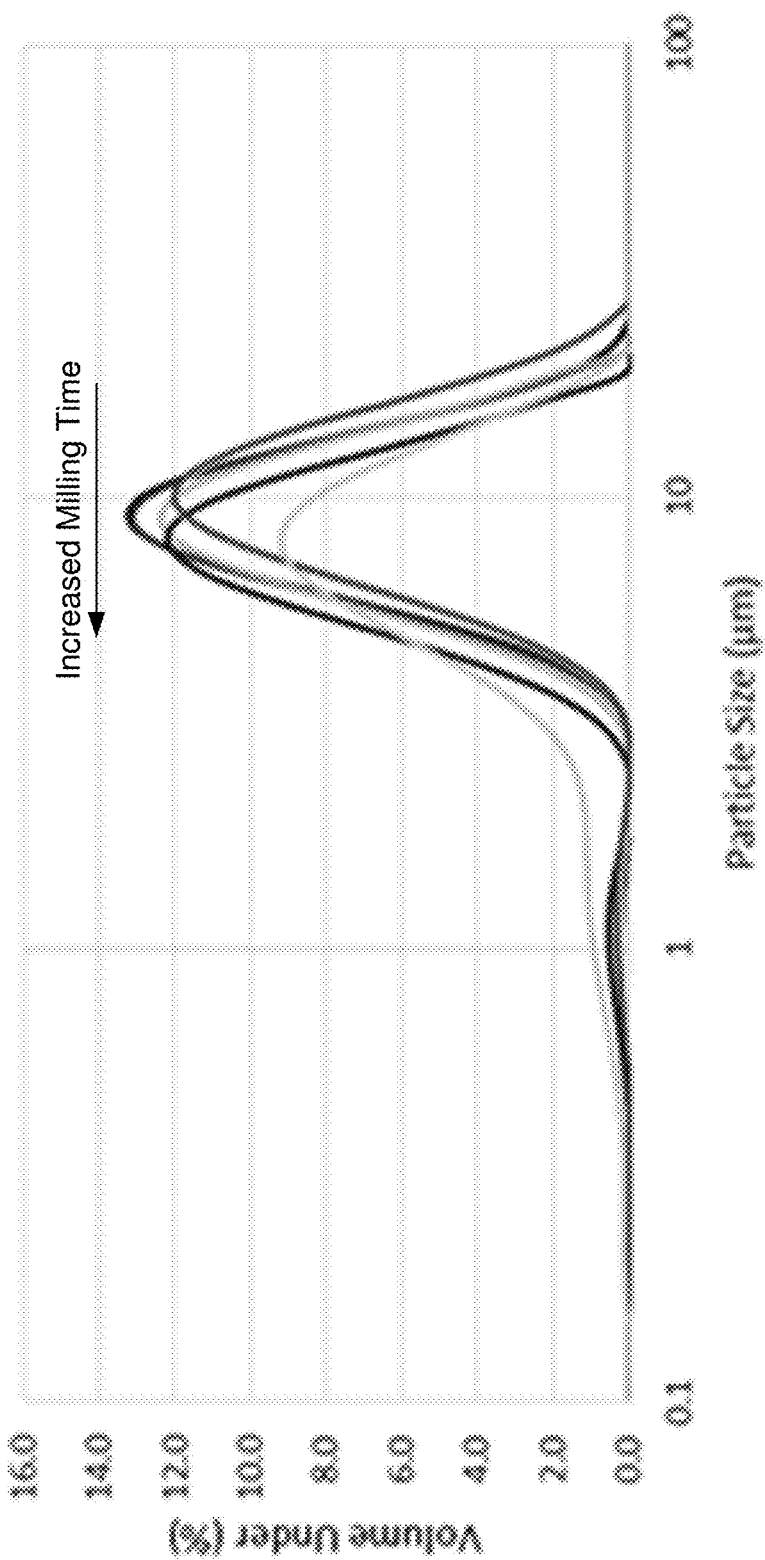
FIG. 6 illustrates the change in particle size distribution with milling time, in accordance with an example embodiment of the disclosure.

FIG. 6 illustrates the change in particle size distribution with milling time, in accordance with an example embodiment of the disclosure. Referring to FIG. 6, there is shown silicon particle size distributions for slurries mixed for various milling durations. In a ball milling process, the active material is milled in solvent in 0.5 inch cylindrical Zirconia grinding media for durations ranging from 1 to 12 hours, and then mixed with a binder/resin via high shear dispersion. The particle size distribution of the milled active materials in solvent is measured after the completion of ball milling. The values at each particle size indicate the percentage of material that comprises particles of that size. As can be seen by the curves in the plot, longer milling time shifts the curves left to smaller particle size distributions. The process is therefore a tradeoff of minimizing the particle size reduction while still maintaining the quality of the mix.

Figure 7:
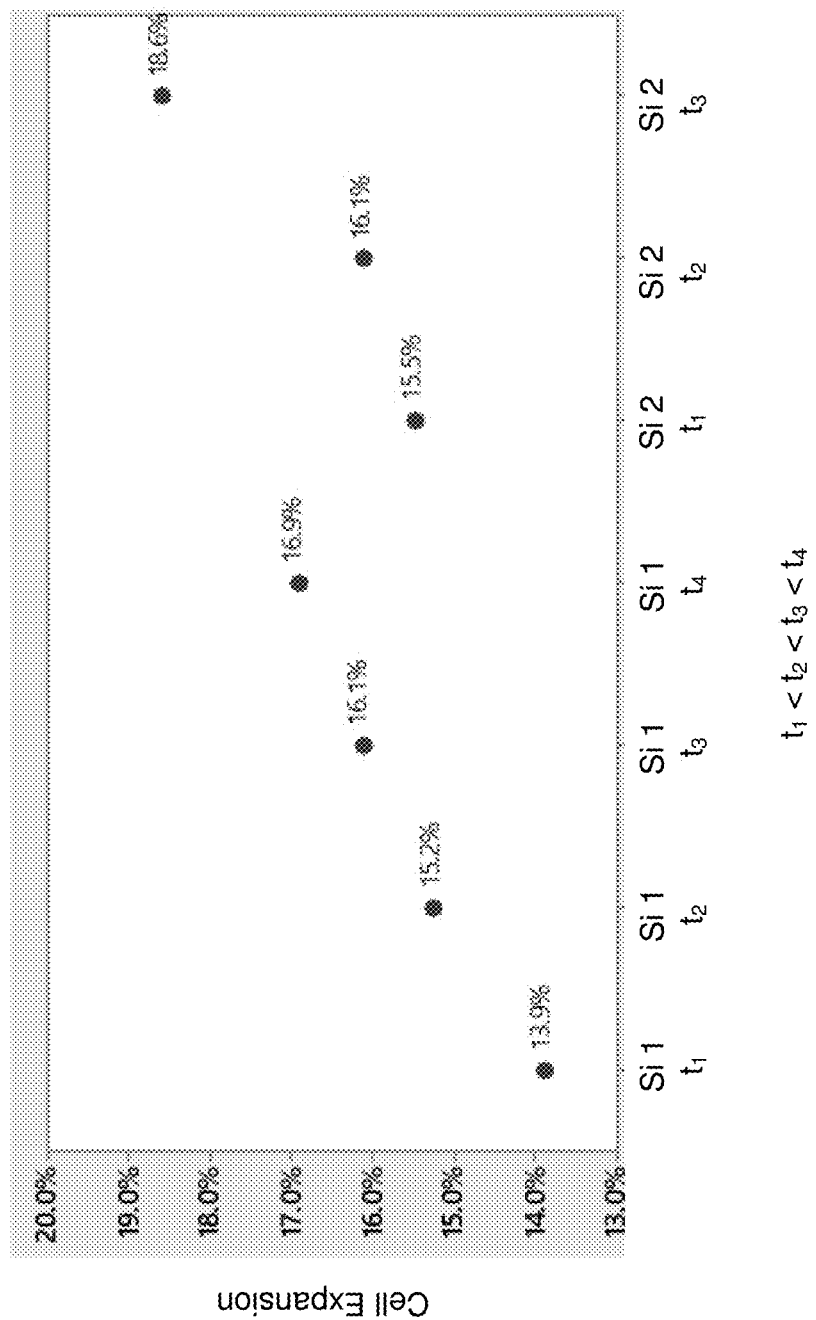
FIG. 7 illustrates anode expansion for various active material milling times in fabricating the anode, in accordance with an example embodiment of the disclosure.

FIG. 7 illustrates anode expansion for various active material milling times in fabricating the anode, in accordance with an example embodiment of the disclosure. Referring to FIG. 7, there is shown the expansion of various cells formed with different ball mixing times of the active material. The two materials shown are subjected to mixing times $t_1$-$t_4$ where $t_1$ is the shortest and $t_4$ is the longest, ranging from 1 to 12 hours. As can be seen by the increasing expansion, the anodes formed with longer milling times have significantly higher expansion than those with shorter milling times, demonstrating that smaller particles result in increased expansion of the cell.

Figure 8:
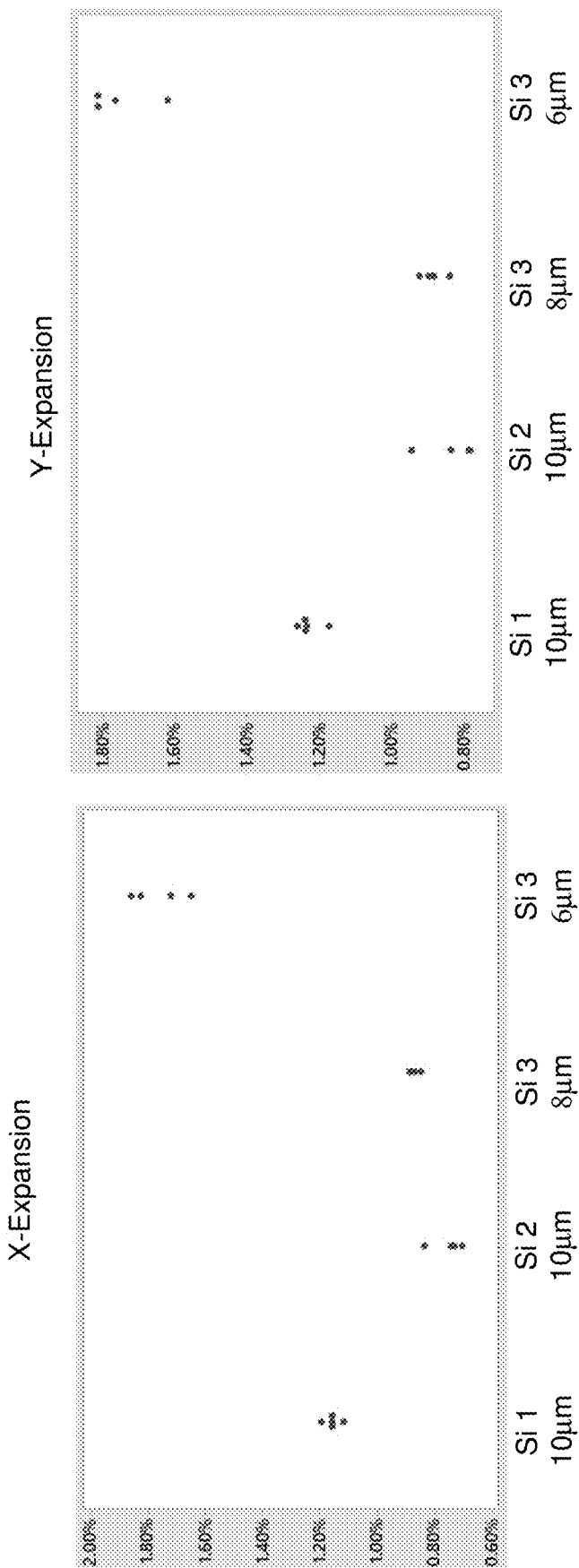
FIG. 8 illustrates x- and y-direction expansion for cells with different silicon particle size distributions, in accordance with an example embodiment of the disclosure.

FIG. 8 illustrates x- and y-direction expansion for cells with different silicon particle size distributions, in accordance with an example embodiment of the disclosure. Referring to FIG. 8, there is shown expansion levels in the x- and y-directions for anodes formed with different silicon source materials and particle size distributions. Generally, the larger the particle size, the lower the expansion, although there is also a silicon source dependency, and may be affected by the width of the particles size distribution and the percentage of fines (particles <5 μm) in the mixture. These anodes are flat press laminated on 6 μm copper foils, which is a thin foil that allows more expansion than thicker foils. Nevertheless, FIG. 8 shows that larger silicon particle size distributions do reduce anode expansion.

Figure 9:
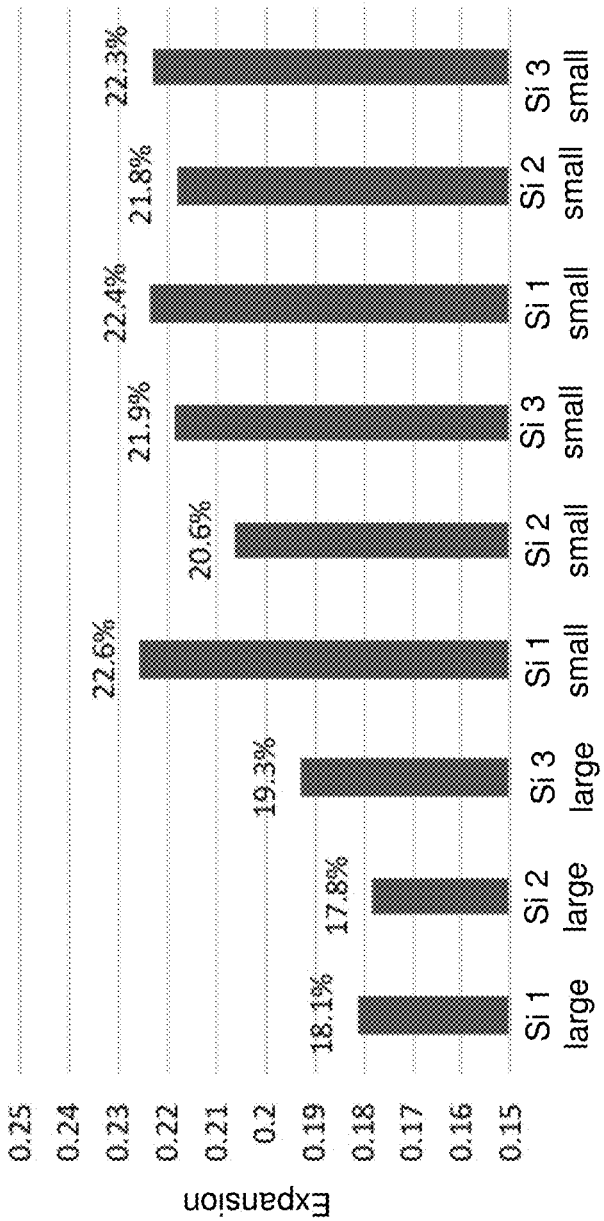
FIG. 9 illustrates z-direction expansion for cells with different silicon source material and particle size distributions in accordance with an example embodiment of the disclosure.

FIG. 9 illustrates z-direction expansion for cells with different silicon source material and particle size distributions, in accordance with an example embodiment of the disclosure. Referring to FIG. 9, there is shown expansion data for different silicon sources, labeled as Si 1, Si 2, and Si 3, each processed to have a larger particle size distribution and a smaller particle size distribution, with data for redundant samples of the small particle size distributions.

As shown in the bar chart, each of the larger particle size distribution anodes has lower z-direction expansion as compared to the small particle size distribution anodes. Typical large particle size distributions are D1~5 μm, D50~10 μm, and D100~25 μm while small particles size distribution are D1~1 μm, D50~8 μm, and D100~20 μm. Accordingly, by configuring the particle size distribution of the silicon in silicon-dominant anodes, the expansion of the anode during operation may be reduced.

In an example embodiment of the disclosure, a method and system is described for configuring anisotropic expansion of silicon-dominant anodes using particle size. The battery may comprise a cathode, an electrolyte, and an anode, where the anode may comprise a current collector and an active material on the current collector. An expansion of the anode may be configured utilizing a predetermined particle size distribution of silicon particles in the active material. The expansion of the anode may be greater for smaller particle size distributions. Smaller particle size distributions may range from 1 to 10 μm.

The expansion of the anode may be smaller for a rougher surface active material. The rougher surface active materials may be configured by utilizing larger particle size distributions. The larger particle size distributions may range from 5 to 25 μm. The expansion of the anode may be configured to be more anisotropic using more rigid materials for the current collector, where a more rigid current collector may comprise nickel and a less rigid current collector may comprise copper. The expansion of the anode may be more anisotropic if the active material is roll press laminated to the current collector. The expansion of the anode may be less anisotropic if the active material is flat press laminated to the current collector.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method of forming a battery, the method comprising:
forming a battery comprising a cathode, an electrolyte, and an anode, wherein the forming comprises:
preparing a slurry mixture, wherein:
the slurry mixture comprises silicon particles in a binder material;
the preparing comprises mixing milled silicon powder with a particular particle size with the binder material; and
the mixing is configured, based on the particular particle size, to achieve a slurry viscosity within a pre-defined viscosity range and a total solid content within a pre-defined content range;
applying the slurry mixture to a current collector;
pyrolyzing the slurry mixture on the current collector to form an active material layer; and
configuring a lateral expansion of the anode to be less than 2% utilizing a predetermined particle size distribution of the silicon particles in the active material layer.

2. The method according to claim 1, wherein the expansion of the anode is greater for silicon particles with particle size distributions ranging from 1-10 μm as compared to the expansion of the anode with silicon particles with particle size distributions of 5-25 μm.

3. The method according to claim 2, wherein the predetermined particle size distribution has a peak at 10 μm.

4. The method according to claim 1, comprising configuring the expansion of the anode by configuring a roughness of the active material layer.

5. The method according to claim 4, comprising configuring the roughness of the active material layer using particle size distributions of 5-25 μm.

6. The method according to claim 5, comprising configuring the particle size distribution of 5 to 25 μm using a mixing process when preparing the slurry.

7. The method according to claim 1, wherein the current collector comprises nickel.

8. The method according to claim 1, comprising roll press laminating the active material layer to the current collector.

* * * * *